United States Patent
Lim et al.

(10) Patent No.: US 10,313,094 B2
(45) Date of Patent: Jun. 4, 2019

(54) TERMINAL CAPABLE OF SIMULTANEOUSLY PERFORMING CELLULAR COMMUNICATION AND D2D COMMUNICATION

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/509,472

(22) PCT Filed: Sep. 23, 2015

(86) PCT No.: PCT/KR2015/010002
§ 371 (c)(1),
(2) Date: Mar. 7, 2017

(87) PCT Pub. No.: WO2016/052909
PCT Pub. Date: Apr. 7, 2016

(65) Prior Publication Data
US 2017/0288842 A1    Oct. 5, 2017

Related U.S. Application Data

(60) Provisional application No. 62/056,614, filed on Sep. 29, 2014.

(51) Int. Cl.
*H04L 5/14* (2006.01)
*H04B 1/00* (2006.01)
(Continued)

(52) U.S. Cl.
CPC ............... *H04L 5/14* (2013.01); *H04B 1/00* (2013.01); *H04B 1/44* (2013.01); *H04L 5/001* (2013.01);
(Continued)

(58) Field of Classification Search
None
See application file for complete search history.

(56) References Cited

U.S. PATENT DOCUMENTS 9,813,934 B2 * 11/2017 Lim .................. H04W 28/0215
2012/0009887 A1 * 1/2012 Sanguinetti .......... H04B 1/0057
455/78
(Continued)

FOREIGN PATENT DOCUMENTS

JP        5285806        9/2013
KR     20140110642      9/2014
(Continued)

OTHER PUBLICATIONS

PCT International Application No. PCT/KR2015/010002, International Search Report dated Jan. 8, 2016, 2 pages.

*Primary Examiner* — Otis L Thompson, Jr.
(74) *Attorney, Agent, or Firm* — Lee, Hong, Degerman, Kang & Waimey

(57) ABSTRACT

One disclosure of the present specification provides a terminal capable of simultaneously performing a cellular communication and a D2D communication. The terminal comprises: a first duplexer for separating a transmission signal and a reception signal in a first band for LTE/LTE-Advanced based cellular communication; a second duplexer for separating a transmission signal and a reception signal in a second band; a third duplexer for separating a transmission signal and a reception signal in a third band; and a first band switch for selecting one of the first duplex, the second duplex and the third duplex, wherein when the first band is (Continued)

only used for the cellular communication and the second band is disabled, the second duplex uses the second band for device to device (D2D) communication, and the first band and the second band may correspond to a different inter-band to each other.

6 Claims, 19 Drawing Sheets

(51) Int. Cl.
*H04B 1/44* (2006.01)
*H04L 5/00* (2006.01)
*H04W 84/04* (2009.01)
*H04W 88/06* (2009.01)
*H04W 92/18* (2009.01)

(52) U.S. Cl.
CPC ............ *H04L 5/003* (2013.01); *H04L 5/0044* (2013.01); *H04L 5/0048* (2013.01); *H04L 5/0053* (2013.01); *H04W 84/04* (2013.01); *H04W 88/06* (2013.01); *H04W 92/18* (2013.01)

(56) References Cited

U.S. PATENT DOCUMENTS

| | | | |
|---|---|---|---|
| 2013/0016633 A1* | 1/2013 | Lum | H04B 1/0057 370/277 |
| 2014/0140336 A1 | 5/2014 | Callard et al. | |
| 2014/0161095 A1* | 6/2014 | Nan | H04W 73/023 370/330 |
| 2014/0295775 A1* | 10/2014 | Rousu | H04B 1/006 455/73 |
| 2014/0328267 A1* | 11/2014 | Ryu | H04W 4/70 370/329 |
| 2014/0362824 A1* | 12/2014 | Rousu | H04L 5/001 370/331 |
| 2015/0092680 A1* | 4/2015 | Kahrizi | H04B 1/0057 370/329 |
| 2015/0092756 A1* | 4/2015 | Sorrentino | H04W 56/0045 370/336 |
| 2015/0249516 A1* | 9/2015 | Sundstrom | H04W 76/14 370/280 |
| 2015/0257007 A1* | 9/2015 | Solondz | H04W 12/08 713/154 |
| 2015/0303974 A1* | 10/2015 | Domino | H04B 1/006 370/297 |
| 2016/0037322 A1* | 2/2016 | Nguyen | H04W 76/14 370/329 |
| 2016/0044618 A1* | 2/2016 | Sheng | H04W 56/002 370/329 |
| 2017/0170945 A1* | 6/2017 | Ji | H04L 5/14 |
| 2017/0245312 A1* | 8/2017 | Kalhan | H04W 76/023 |
| 2017/0280344 A1* | 9/2017 | Siomina | H04W 24/10 |
| 2017/0332355 A1* | 11/2017 | Venkatasubramanian | H04W 72/042 |
| 2018/0241369 A1* | 8/2018 | Ghim | H03H 7/46 |

FOREIGN PATENT DOCUMENTS

| | | |
|---|---|---|
| WO | 2013130986 | 9/2013 |
| WO | 2014088218 | 6/2014 |

* cited by examiner

TERMINAL CAPABLE OF SIMULTANEOUSLY PERFORMING CELLULAR COMMUNICATION AND D2D COMMUNICATION

CROSS-REFERENCE TO RELATED APPLICATIONS

This application is the National Stage filing under 35 U.S.C. 371 of International Application No. PCT/KR2015/010002, filed on Sep. 23, 2015, which claims the benefit of U.S. Provisional Application No. 62/056,614, filed on Sep. 29, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Recently, 3GPP LTE has evolved into 3GPP LTE-Advanced (LTE-A). According to LTE-A, carrier aggregation (CA) has been proposed which a technology of using multiple bands as one group.

A frequency band used for LTE/LTE-A, that is, a carrier, is defined in 3GPP in consideration of radio wave situations of various countries.

Meanwhile, with increasing demands for Social Network Service (SNS), communication between physically close UEs, that is, Device to Device (D2D) is required.

However, D2D communication and existing cellular communication, that is, communication with a base station, may interfere with each other.

SUMMARY OF THE INVENTION

Accordingly, an object of the present invention is to solve the above-mentioned problems.

To solve the above problem, there is provided a User Equipment (UE) capable of simultaneously performing Device to Device (D2D) communication and cellular communication. The UE includes: a first duplexer configured to separate a transmission signal and a reception signal in a first band for Long Term Evolution (LTE)/LTE-Advanced cellular communication; a second duplexer configured to separate a transmission signal and a reception signal in a second band; and a first band switch configured to select one of the first duplexer, the second duplexer, and the third duplexer. The first band and the second band may correspond to different inter-bands. When only the first band is used for the cellular communication and the second band is disabled, the second duplexer may use the second band only for Device to Device (D2D) communication. The UE may further include a radio frequency integrated circuit (RFIC) configured to process a reception signal of the first band and a reception signal of the second band. The RFIC may selectively transmit data by outputting the transmission signal of the first band and the transmission signal of the second band to the first and second duplexers.

The UE may further include a diplexer connected between the first band switch and the first duplexer and between the first band switch and the second duplexer. The diplexer may transmit both of a transmission signal of the first band from the first duplexer and a transmission signal of the second band from the second duplexer to the first band switch.

The UE may further include a second band switch, and a diplexer connected to the first band switch and the second band switch.

The D2D signal may include a discovery signal, a control channel, and a data channel.

The D2D signal may include at least one of a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH).

According to the disclosure of the present invention, the aforementioned problem is solved.

DESCRIPTION OF EXEMPLARY EMBODIMENTS

Figure 1:
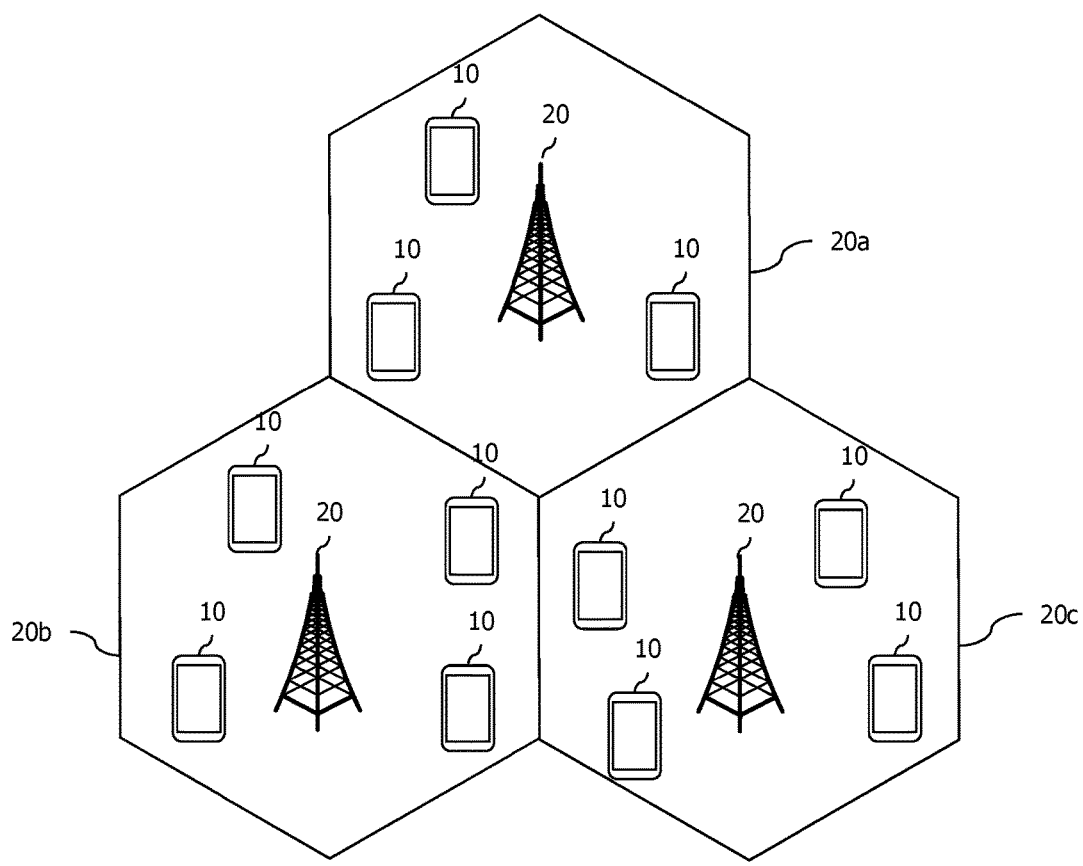
FIG. 1 is an exemplary diagram illustrating a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates an exemplary diagram illustrating a wireless communication system.

As seen with reference to FIG. 1, the wireless communication system includes at least one base station (BS) 20. Each base station 20 provides a communication service to specific geographical areas (generally, referred to as cells) 20a, 20b, and 20c.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
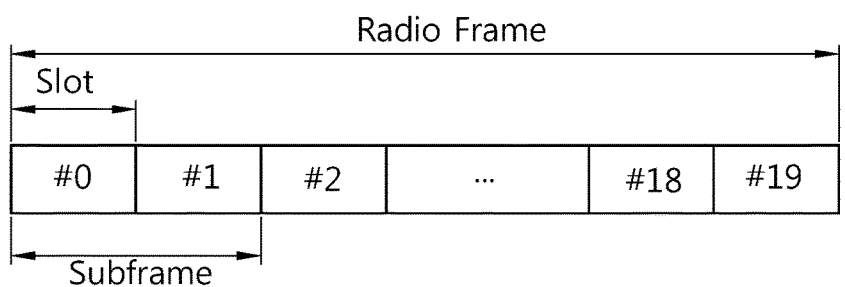
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP).

Figure 3:
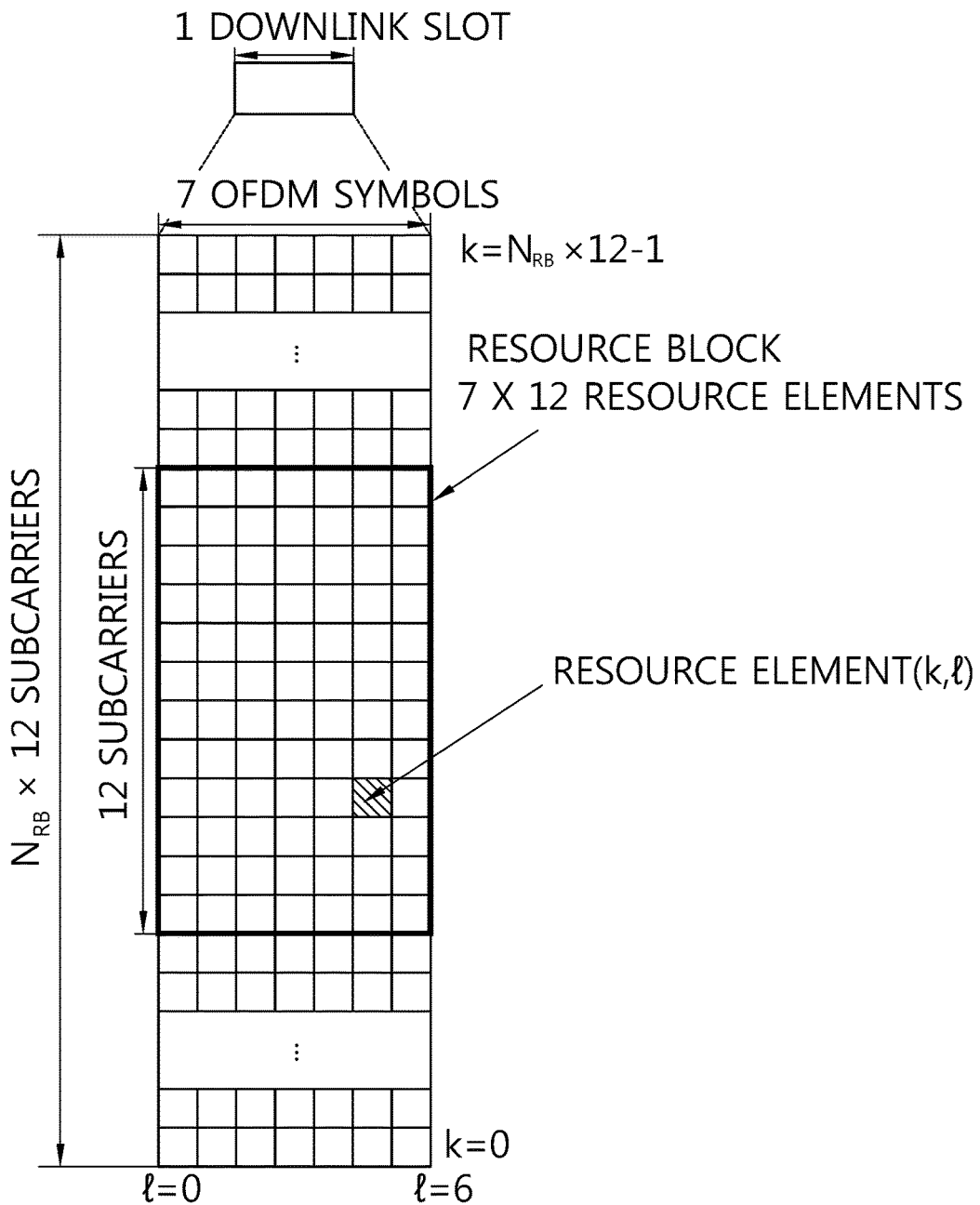
FIG. 3 is an exemplary diagram illustrating a resource grid for one uplink or downlink slot in the 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
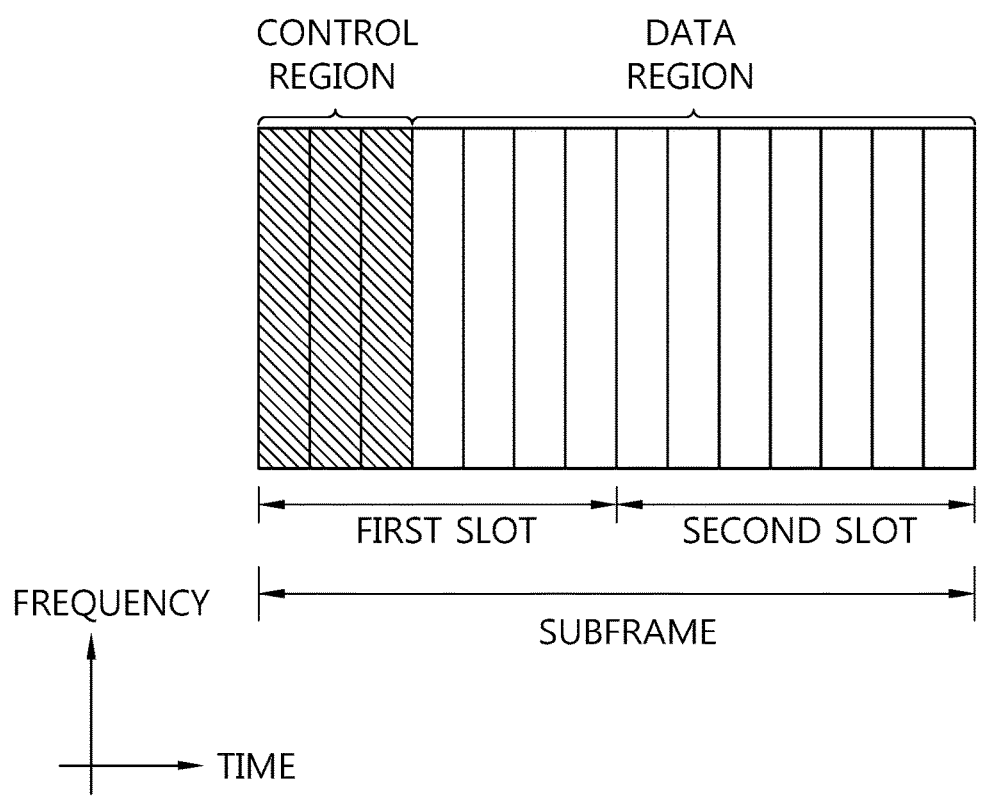
FIG. 4 illustrates a structure of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
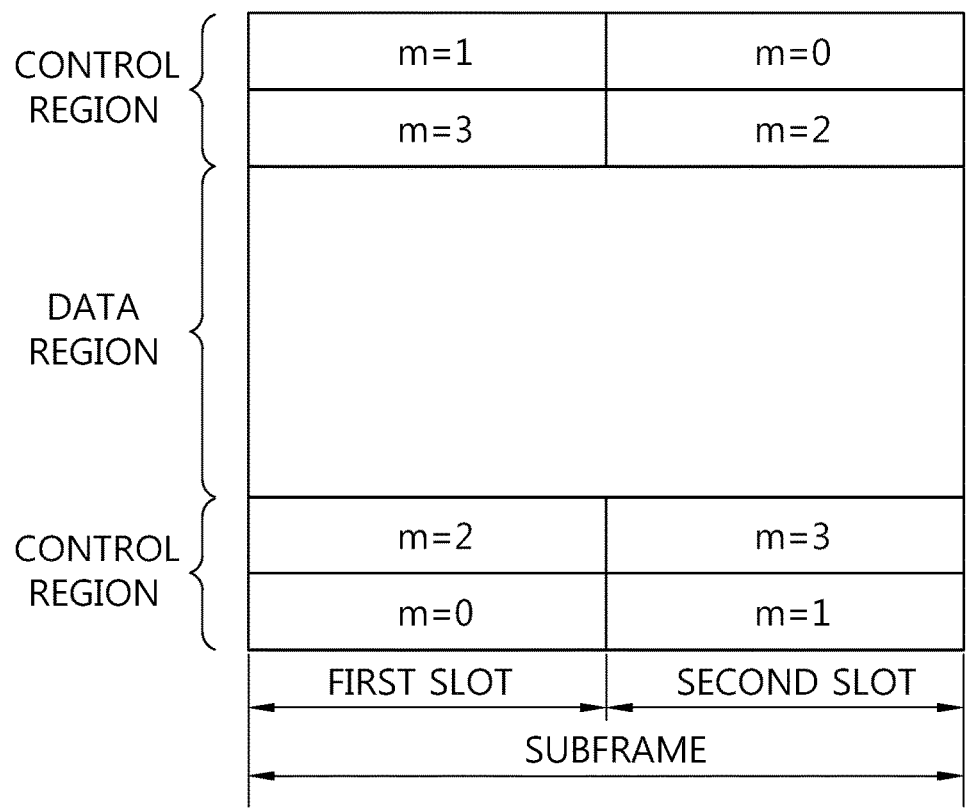
FIG. 5 illustrates the architecture of an uplink sub-frame in 3GPP LTE.
Figure 5:
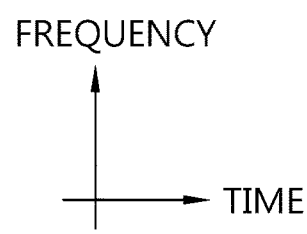

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The UE may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

A CA system may be divided into a contiguous CA system, in which aggregated carriers are contiguous, and a non-contiguous CA system in which aggregated carriers are not contiguous. It should be understood that a CA system used hereinafter indicates both the case where aggregated carriers are contiguous and the case where aggregated carriers are non-contiguous. The number of CCs aggregated in a downlink and the number of CCs aggregated in an uplink may be set differently. A case where the number of downlink CCs and the number of uplink CCs are the same, it is called symmetric aggregation, and the opposite case is called asymmetric aggregation.

Meanwhile, CA technologies may be divided into an inter-band CA technology and an intra-band CA technology. The inter-band CA is a method which employs aggregation of CCs existing in different bands, and the intra-band CA technology is a method which employs aggregation CCs in the same frequency band. More specifically, the CA technologies is divided into intra-band contiguous CA, intra-band non-contiguous CA, and inter-band non-contiguous CA.

Figure 6A:
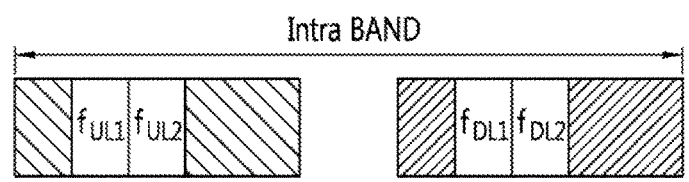
FIGS. 6A and 6B are conceptual diagram illustrating intra-band Carrier Aggregation (CA).
Figure 6B:
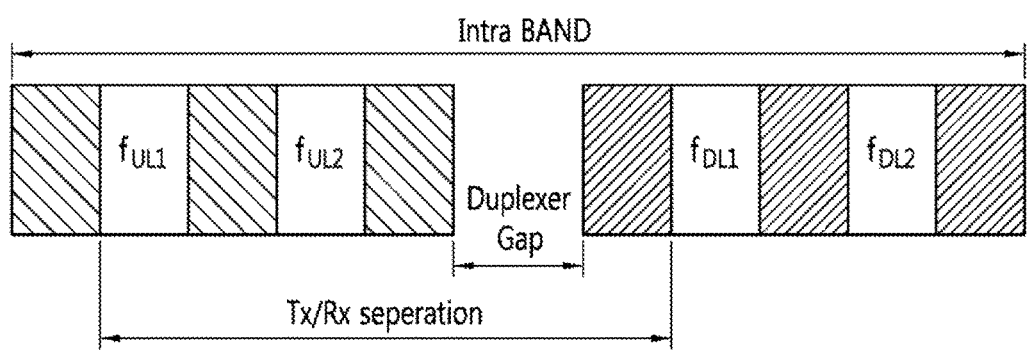

FIGS. 6A and 6B are conceptual diagrams illustrating intra-band CA.

FIG. 6A illustrates intra-band contiguous CA, and FIG. 6B illustrates intra-band non-contiguous CA.

For high-speed wireless transmission, various techniques have been added to LTE-Advance system, including uplink MIMO and CA. CA discussed in LTE-Advance system may be divided into intra-band contiguous CA, shown in FIG. 6A, and intra-band non-contiguous CA, shown in FIG. 6B.

Figure 7A:
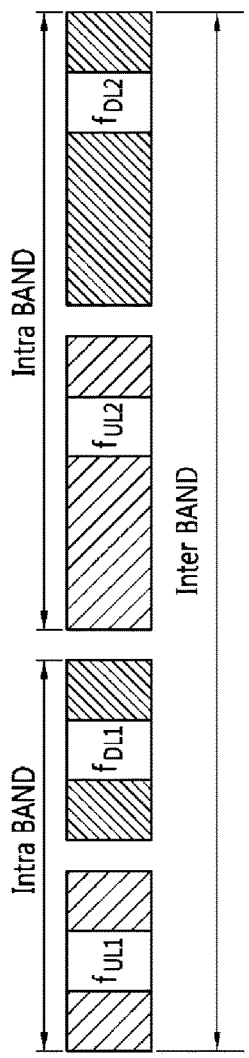
FIGS. 7A and 7B are conceptual diagram illustrating inter-band CA.
Figure 7B:
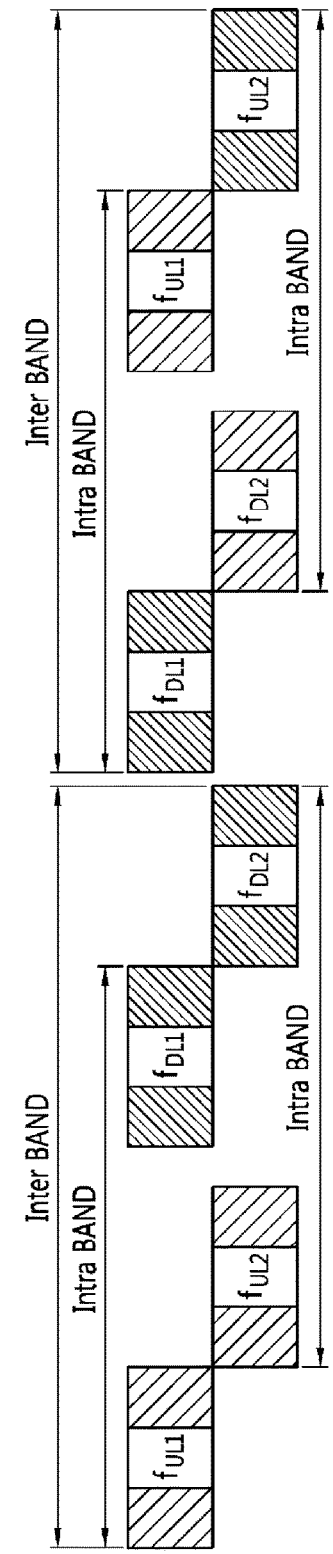

FIGS. 7A and 7B are conceptual diagrams illustrating inter-band CA.

FIG. 7A illustrates a combination of a low band and a high band for inter-band CA, and FIG. 7B illustrates a combination of neighboring frequency bands for inter-band CA.

That is, inter-band CA may be divided into: inter-band CA between a low-band carriers and high-band carriers, as shown in FIG. 7A, which have different radio frequency (RF) characteristics; and inter-band CA between neighboring frequencies, as shown in FIG. 7B, which have similar RF characteristics and therefore each CC is able to use a common RF port.

TABLE 2

| E-UTRA Operating Band | Uplink (UL) Operating Band $F_{UL\_low}$-$F_{UL\_high}$ | Downlink (DL) Operating Band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.2 MHz-475.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |

TABLE 2-continued

| E-UTRA Operating Band | Uplink (UL) Operating Band $F_{UL\_low}$-$F_{UL\_high}$ | Downlink (DL) Operating Band $F_{DL\_low}$-$F_{DL\_high}$ | Duplex Mode |
|---|---|---|---|
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

3GPP LTE/LTE-A system has defined uplink (UL) and downlink (DL) operating bands, as shown in the above Table 1. Four CA cases shown in FIGS. 6 and 7 can be distinguished With reference to Table 1.

Here, FUL_low denotes the lowest frequency in an UL operating band. FUL_high denotes the highest frequency in an UL operating band. FDL_low denotes the lowest frequency in an DL operating band. FDL_high denotes the highest frequency in a DL operating band.

If an operating band is set as in Table 1, a country's organization responsible for distributing frequencies may allocate a specific frequency to a service provider in consideration of the country's situation or condition.

Figure 8:
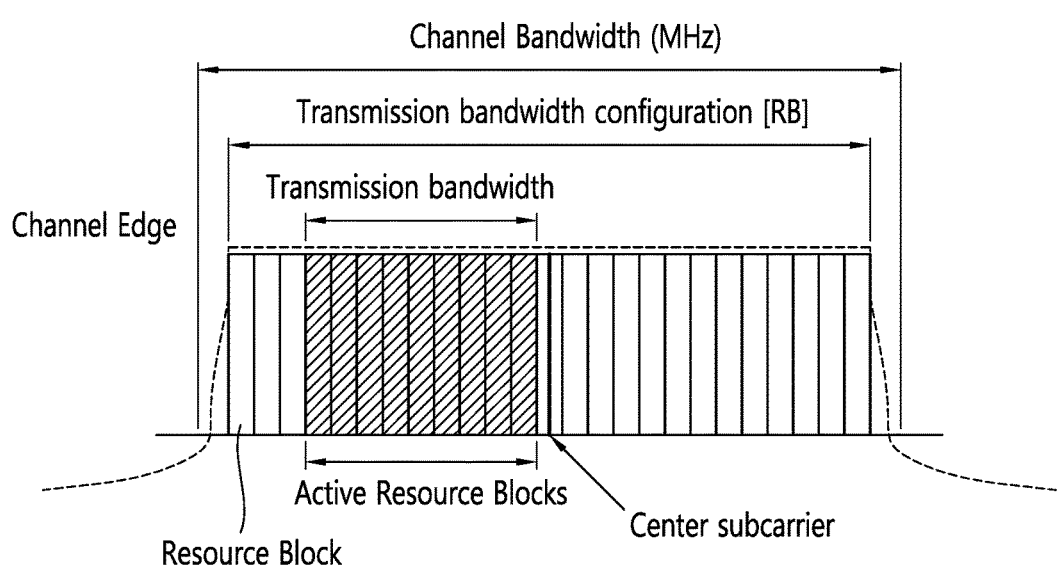
FIG. 8 illustrates a relation between a channel bandwidth (MHz) and a resource block (RB).

FIG. 8 illustrates a relation between a channel band MHz and a resource block (RB).

As found with reference to FIG. 8, a transmission bandwidth is configured to be smaller than a channel bandwidth BWChannel. A transmission bandwidth is configured by a plurality of RBs. In addition, the outside of channel is the highest or lowest frequency that is separated by a channel bandwidth.

Meanwhile, as described above, 3GPP LTE system supports channel bandwidths of 1.4 MHz, 3 MHz, 5 MHz, 10 MHz, 15 MHz, and 20 MHz. Relations between a channel bandwidth and the number of RBs are shown in the following table.

TABLE 2

| Channel Bandwidth BWChannel [MHz] | 1.4 | 3 | 5 | 10 | 15 | 20 |
|---|---|---|---|---|---|---|
| Configuration of Transmission Bandwidth $N_{RB}$ | 6 | 15 | 25 | 50 | 75 | 100 |

<Introduction of Small Cell>

In a next-generation mobile communication system, it is expected that a small cell having a narrow cell coverage will be added in the coverage of an existing cell and that the small cell will process more traffics. The existing cell has a wider coverage than that of the small cell, and thus, it can be called a macro cell. Hereinafter, description will be provided with reference to FIG. 7.

Figure 9:
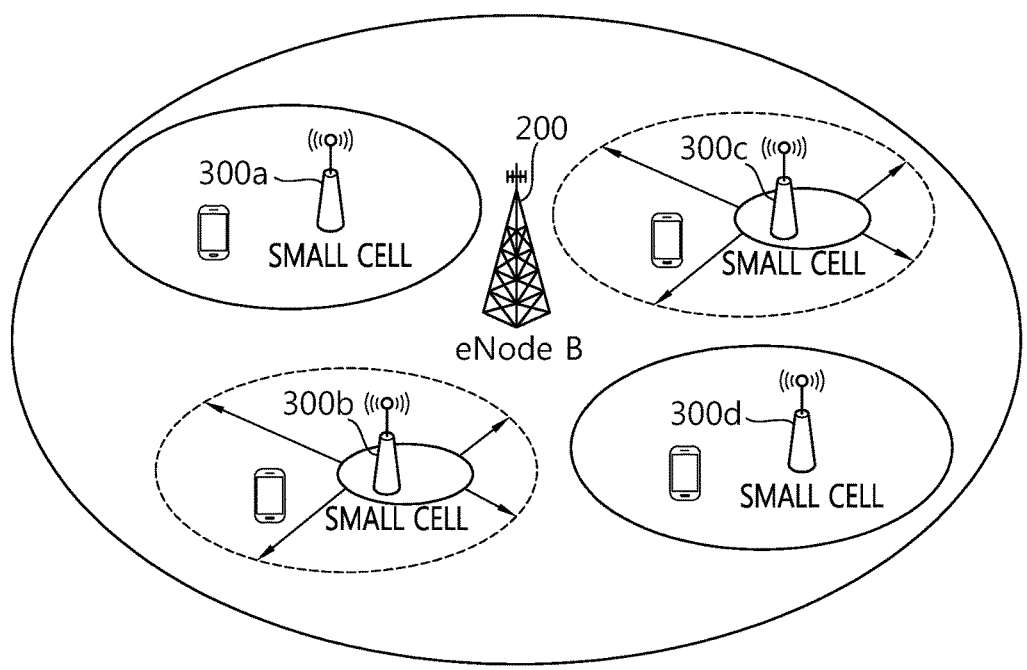
FIG. 9 is a diagram illustrating environment of a heterogeneous network including a macro cell small cells, the network which is regarded a potential next-generation wireless communication system.

FIG. 9 is a diagram illustrating environment of a heterogeneous network including a macro cell small cells, the network which is regarded a potential next-generation wireless communication system.

Referring to FIG. 9, there is shown environment of a heterogeneous network in which a macro cell defined by an existing base station 200 is overlapped with a small cell defined by one or more small base stations 300*a*, 300*b*, 300*c*, and 300*d*. The existing base station provides a wider coverage than the small base station, and thus, it is called a macro base station (Macro eNodeB (MeNB)). Throughout this specification, a macro cell and a macro base station are used interchangeably. An UE connected to the macro cell 200 may be indicated as a macro UE. The macro UE may receive a downlink signal from the macro base station, and transmit an uplink signal to the macro base station.

In such a heterogeneous network, as the macro cell is configured as a primary cell (Pcell) and the small cell is configured as a secondary cell (Scell), it is possible to close a loophole of the macro cell. In addition, as the small cell is configured as a Pcell and the macro cell is configured as a Scell, it is possible to boost overall performance.

<Device to Device (D2D) Communication>

Meanwhile, D2D communication will be hereinafter described which is expected to be introduced in a next-generation communication system.

Figure 10A:
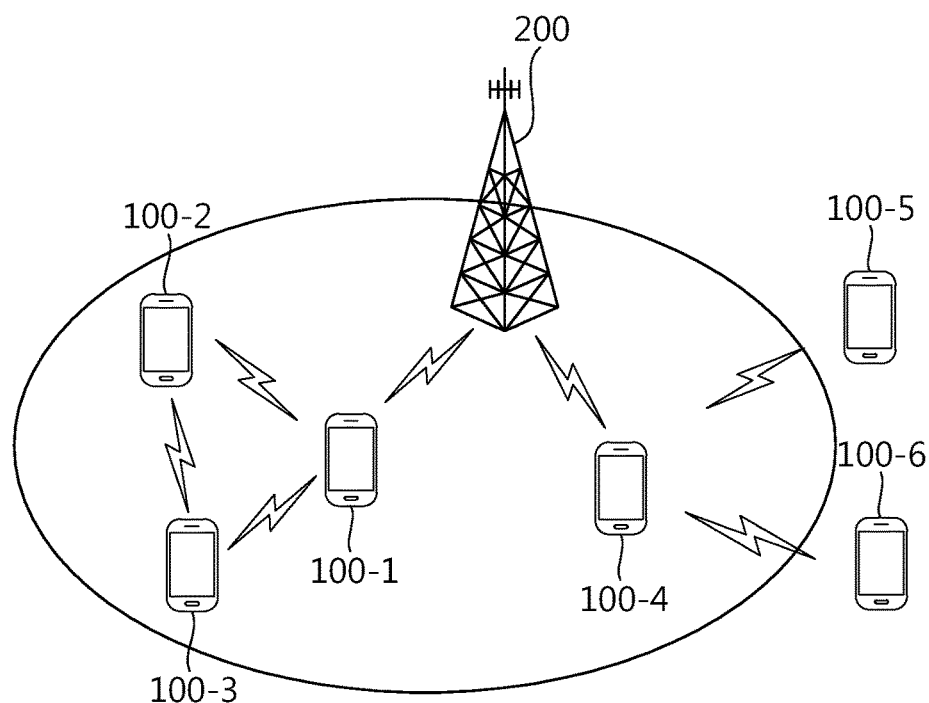
FIG. 10A illustrates a concept of D2D communication that is expected to be introduced in a next-generation communication system.

FIG. 10A illustrates a concept of D2D communication that is expected to be introduced in a next-generation communication system.

With increasing demands for Social Network Service (SNS), there are increasing demands for D2D communication that is communication between physically close UEs.

To meet the above demands, there has been discussed a method that enables direct communication between UE#1 100-1, UE#2 100-2, and UE#3 100-3, or between UE#4 100-4, UE#5 100-5, and UE#6 100-6 without intervention of a base station eNodeB 200. Of course, UE#1 100-1 and UE#4 100-4 may communicate directly with each other with the help of the base station eNodeB 200. Meanwhile, UE##100-1 may act as a relay for UE#2 100-2, and UE#3 100-3. Similarly, UE#4 may act as a relay for UE#5 100-5 and UE#6 100-6 which are located far away from the center of the cell.

Meanwhile, a link between UEs used for the D2D communication may be called a sidelink.

The following are physical channels used for the sidelink.
PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

As described above, it is discussed that D2D communication between UEs can be introduced in the next-generation system.

Figure 10B:
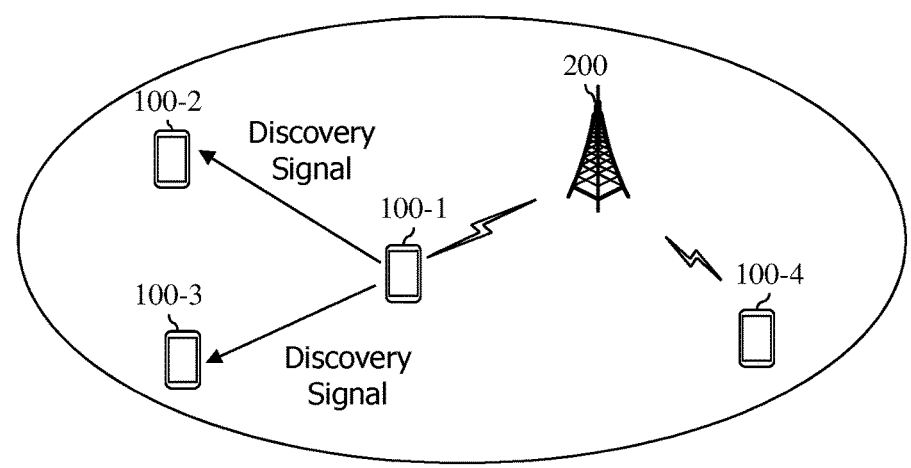
FIG. 10B illustrates an example of transmitting a discovery signal for the purpose of D2D communication.

FIG. 10B illustrates an example of transmitting a discovery signal for the purpose of D2D communication.

UE#1 100-1 shown in FIG. 10B may transmit a discovery signal in order to discover whether there is an appropriate UE in the vicinity or to notify the existence of itself.

<Issue about Coexistence of D2D Communication and Existing LTE/LTE-A Cellular Communication>

However, D2D communication between UEs and cellular communication of an existing UE (that is, communication between an UE and a base station) may interfere with each other. The cellular communication is called Wide Area Network (WAN) communication, compared to the D2D communication. Detailed description thereof will be provided with reference to FIG. 11.

Figure 11:
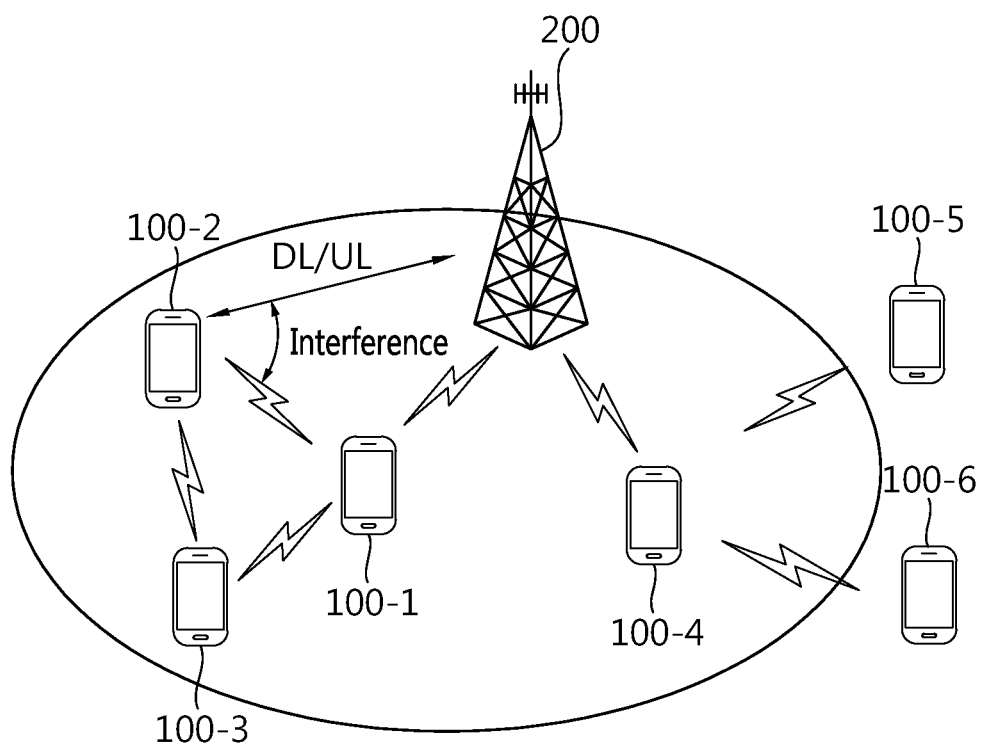
FIG. 11 illustrates an example of interference between next generation Device to Device (D2D) communication and cellular communication.

FIG. 11 illustrates an example of interference between next generation D2D communication and cellular communication.

As illustrated in FIG. 11, D2D communication between UE#2 100-2 and UE#1 100-1 and cellular communication between UE#2 100-2 and the eNodeB 200 may intervene with each other. In particular, uplink transmission to the eNodeB 200 and downlink reception by the eNodeB 200 may intervene with the D2D communication, and the D2D communication may intervene with the uplink transmission to the eNodeB 200 and the downlink reception by the eNodeB 200.

As such, D2D communication between UEs may affect the existing cellular communication between UEs.

Thus, coexistence of D2D communication (including a D2D discovery signal and a D2D communication signal) and the existing cellular communication between UEs have emerged as a key issue.

So far, only coexistence due to interference between different UEs have been studied. In other words, the studies and researches were to analyze effects of a D2D UE on an existing LTE UE, at best.

Thus, the problem that occurs inside an UE simultaneously performing D2D transmitting/receiving operations and cellular transmitting/receiving operations has not been addressed. In addition, how an existing LTE UE affects signal receiving performance of a D2D UE has not been studied.

Figure 12A:
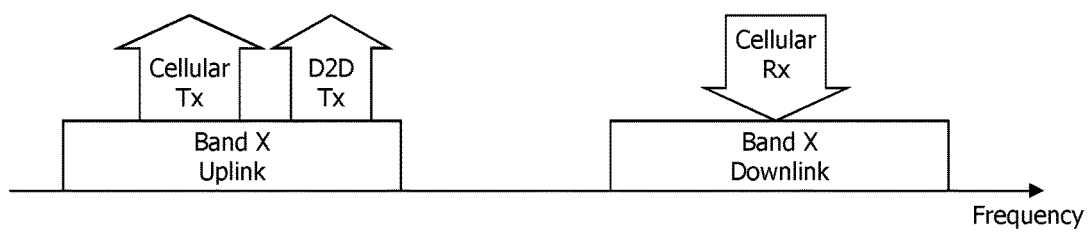
FIG. 12A illustrates an example in which a band for D2D communication and an LTE/LTE-A used for cellular communication are the same.
Figure 12B:
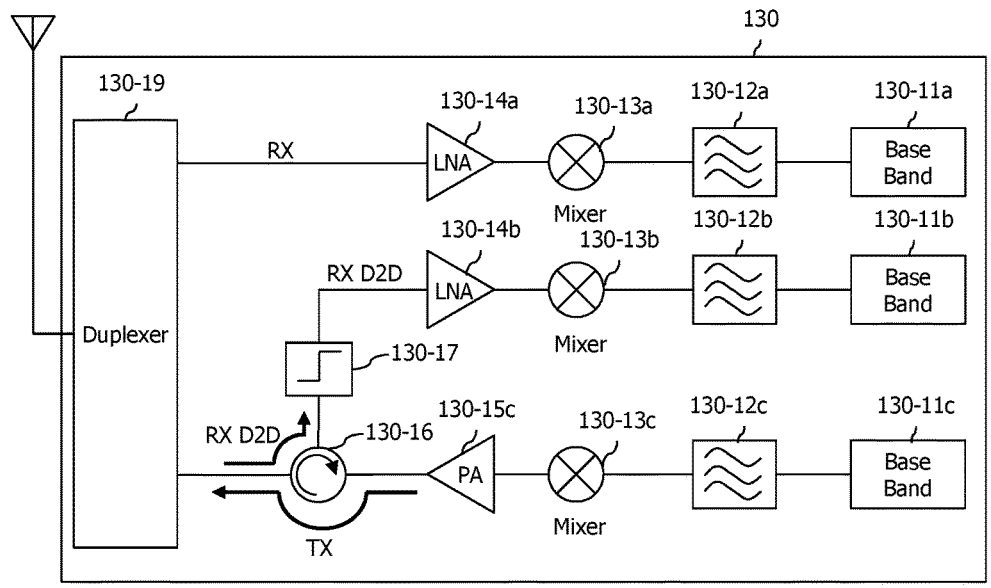
FIGS. 12B and 12C illustrate RF structure.
Figure 12C:
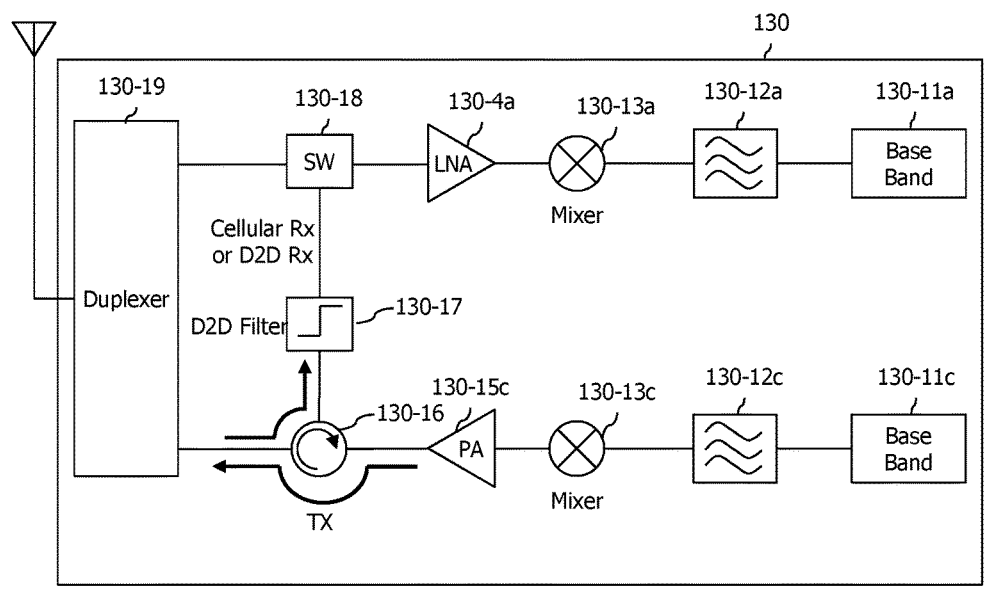

Therefore, this specification will examine each scenario of D2D communication and LTE/LTE-A-based cellular communication within an UE with reference to the following table (showing coexistence scenario inside UE). In addition, all the following scenario will be examined to determine whether each scenario enables simultaneous performing of the D2D communication and the LTE/LTE-A-based cellular communication.

tion and a band for the cellular communication are the same, there are proposed structures for using an existing RF chain, as shown in FIGS. 12B and 12C.

RF structure 130 shown in FIG. 12B includes a first RF chain for processing a cellular reception signal, a second RF chain for processing a D2D reception signal, and a third RF chain for processing a D2D transmission signal or a cellular transmission signal with Time Division Multiplexing (TDM). The first RF chain and the third RF chain use the same change used by an existing LTE/LTE-A UE for cellular communication, and re-use the existing third RF chain for transmitting a D2D transmission signal. That is, the proposed structure shown in FIG. 12B is a structure in which the second RF chain has been added to RF structure of the existing LTE UE to support D2D communication.

The first RF chain for processing a cellular reception signal includes a first base band unit 130-11a, for cellular reception, a first filter 130-12a, a first composition unit 130-13a for outputting an intermediate frequency by removing a first carrier fc1, and a first low noise ampler (LAN) 130-14a.

The second RF chain for processing a D2D reception signal includes a second baseband unit 130-11b for converting a D2D reception signal into a baseband signal, a second filter 130-12b, a second composition unit 130-13b for outputting an intermediate frequency by removing a second carrier fc2, and a second LNA 130-14b.

TABLE 3

| Scenario | Aggressor | Victim | Duplexing Type | Description |
| --- | --- | --- | --- | --- |
| 1 | D2D Tx | LTE UE Rx | TDD and FDD | It is possible to be affected when a band isolation between a transmission band and a reception band is narrow |
| 2 | D2D Tx | LTE UE Tx | TDD and FDD | Support in REl-13 multiple component carrier is possible. A study for D2D-cellular simultaneous transmission in an inter-band is first proceeded in Scenario 2. |
| 3 | LTE UE Rx | D2D Rx | TDD and FDD | It does not seriously affect D2D Rx. |
| 4 | LTE UE Tx | D2D Rx | TDD and FDD | Not yet verified. When D2D Rx-Cellular Tx is performed by separating frequencies in the same band, it seriously affect D2D Rx. However, this can be solved if an appropriate bandwidth gap exists between a D2D Rx band and cellular Tx. |

In addition, this specification will explore RF structures of an UE, which enable simultaneous performing of D2D communication and cellular communication. Specifically, this specification will explore a) RF structure that enables simultaneous performing of D2D communication and cellular communication when a band for the D2D communication and an LTE/LTE-A band for the cellular communication is the same (intra-band D2D-WAN operation), and b) RF structure that enables simultaneous performing of D2D communication and cellular communication when a band for the D2D communication and an LTE/LTE-A band for the cellular communication are different (inter-band D2D-WAN operation).

FIG. 12A illustrates an example in which a band for D2D communication and an LTE/LTE-A used for cellular communication are the same, and FIGS. 12B and 12C illustrate RF structure.

As SF structure, shown in FIG. 12A, which is used to implement both of D2D communication and cellular communication in a UE when a band for the D2D communica- The third chain for processing a D2D transmission signal and a cellular transmission signal includes a third baseband unit 130-11c for transmission, a third filter 130-12c, a third composition unit 130-13c for composition with a carrier, and a power ampler (PA) 130-15c.

The first RF chain and the third RF chain are connected to a duplexer 130-19. The duplexer 130-19 distribute a cellular transmission/reception signal either to the first RF chain or to the third RF chain. In addition, the duplexer 130-19 outputs a transmission signal, received from the third RF chain, to an antenna. A directional coupler or switch 130-15 is connected between the PA 130-15c of the third RF chain and the duplexer 130-19. The directional coupler or switch 130-16 separates a transmission signal (Tx) and a D2D reception signal (Rx). That is, a D2D signal received at a transmission frequency is conveyed by the directional coupler or switch to a D2D reception unit, without affecting a cellular transmission unit.

What is noteworthy is that an interference removal filter 130-17 is connected between the directional coupler or switch 130-16 of the third RF chain and the second LNA 130-14b of the second RF chain in order to reduce interference by a neighboring channel with a reception signal.

In this structure, the directional coupler 130-16 transmits a signal, which is output from the PA 130-15c of the third RF chain, to the duplexer 130-19 and a D2D reception signal, which is received from the duplexer 130-19, to the interference removal filter 130-17. The interference removal filter 130-17 performs filtering to prevent self-interference that is caused by leakage of a signal from the PA 130-15c of the third RF chain into the second RF chain, or the interference removal filter 130-17 performs filtering on interference by a neighboring signal when a D2D reception signal received by an antenna comes through a duplexer.

Unlike the structure shown in FIG. 12B, the RF structure 130 shown in FIG. 12C is a structure that is designed to support D2D transmission and reception using only a RF chain that is used in existing cellular communication, and the structure 130 includes a first RF chain for supporting D2D reception or cellular reception with TDM, and a third RF chain for supporting D2D transmission or cellular transmission with TDM.

A switch 130-18 is connected between a duplexer 130-19 and a first LNA 130-14a of the first RF chain. In addition, a directional coupler or switch 130-16 is connected between the duplexer 130-19 and a PA 130-15c of the third RF chain. An interference removal filter 130-17 is connected between the directional coupler or switch 130-16 and the switch 130-18.

In this structure, the directional coupler or switch 130-16 transmits a signal, which is output from the PA 130-15c of the third RF chain, to the duplexer 130-19 and a D2D reception signal, which is received from the duplexer 130-19, to the interference removal filter 130-17. The interference removal filter 130-17 performs filtering to prevent self-interference that is caused by leakage of a signal from the PA 130-15c of the third chain into the first RF chain. A signal from the interference removal filter 130-17 is output to the switch 130-18. The switch 130-18 outputs a signal output from the duplexer 130-19 and a signal output from the interference removal filter 130-17, alternatively, to the first LAN 130-14a.

Meanwhile, if an operating band of D2D communication and an operating band of cellular communication are the same, the coexistence issue is raised in every scenario. Thus, every scenario will be hereinafter examined with reference to FIGS. 13A to 13D.

Figure 13A:
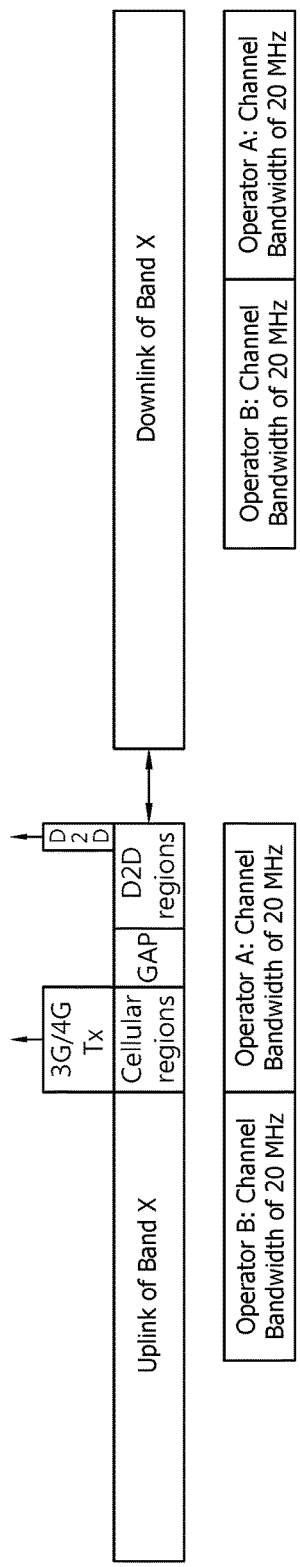
FIG. 13A is about D2D-cellular simultaneous transmission that is expected when the same operator divides possessed frequencies and performs D2D communication on one side and cellular communication on the other side: that is, it shows Coexistence Scenario 1 in which D2D transmission and cellular transmission are performed simultaneously in consideration of GAP in order to reduce interference by a cellular transmission signal on a D2D reception signal.

FIG. 13A is about D2D-cellular simultaneous transmission that is expected when the same operator divides possessed frequencies and performs D2D communication on one side and cellular communication on the other side; that is, it shows Coexistence Scenario 1 in which D2D transmission and cellular transmission are performed simultaneously in consideration of GAP in order to reduce interference by a cellular transmission signal on a D2D reception signal.

Referring to FIG. 13A, it appears that a band isolation between a D2D transmission band and a cellular reception band is smaller than a band isolation between a transmission band and a reception band defined by the existing LTE system. In this case, a D2D signal is leaked into the cellular reception band, so reference sensitivity REFSENS of cellular reception may fail to satisfy the current requirements in the Band X. However, when a band isolation between a transmission band and a reception band is greater than 100 MHz, it is possible to attenuate D2D interference in the cellular reception bad by using a filter and therefore maintain the cellular reception sensitivity. Thus, whether a UE is able to simultaneously perform D2D transmission and cellular reception depends on each operating band.

Figure 13B:
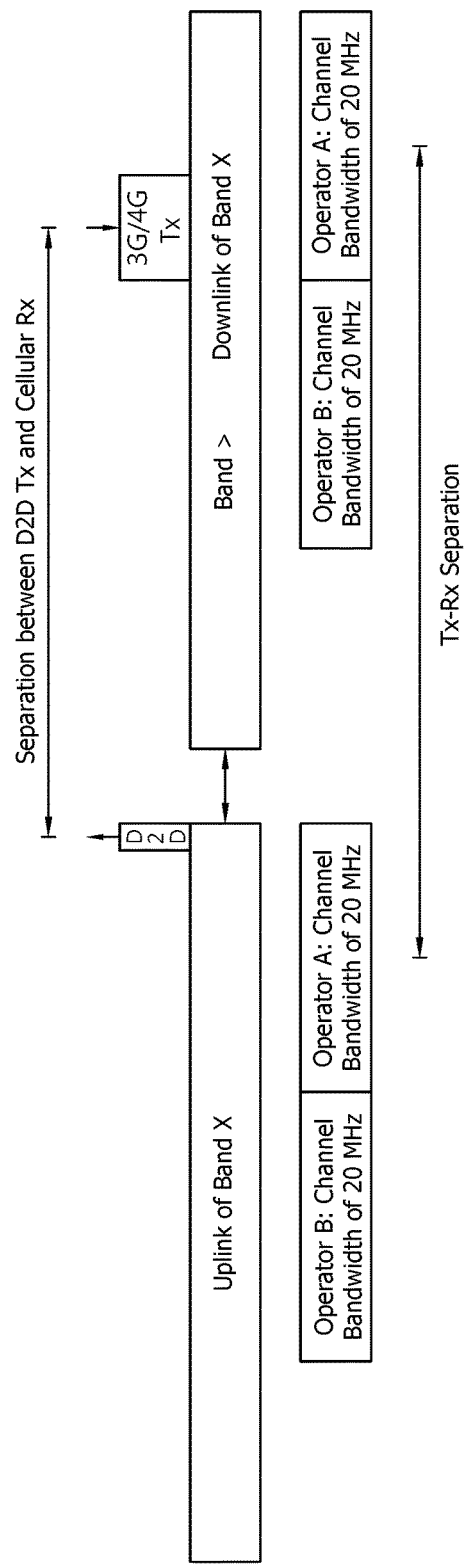
FIG. 13B shows Coexistence Scenario 2 in which, when the same operator manages frequencies separately for D2D communication and cellular communication, D2D transmission is performed at an uplink frequency and cellular reception is performed at a downlink frequency so that D2D transmission and cellular reception are performed simultaneously.

FIG. 13B shows Coexistence Scenario 2 in which, when the same operator manages frequencies separately for D2D communication and cellular communication, D2D transmission is performed at an uplink frequency and cellular reception is performed at a downlink frequency so that D2D transmission and cellular reception are performed simultaneously.

Referring to FIG. 13B, simultaneous performing of D2D transmission and cellular transmission is similar to intra-band non-contiguous CA. However, in this case, transmission power unbalance between a D2D signal and a cellular signal should be considered. In general, D2D transmission should not affect a cellular transmission signal, so, if a cellular signal is transmitted with high power, a D2D signal may be transmitted with a relatively low power and accordingly affected by interference by the cellular signal. Thus, it is necessary to define a protection gap or A-MPR in order to protect the D2D signal.

Figure 13C:
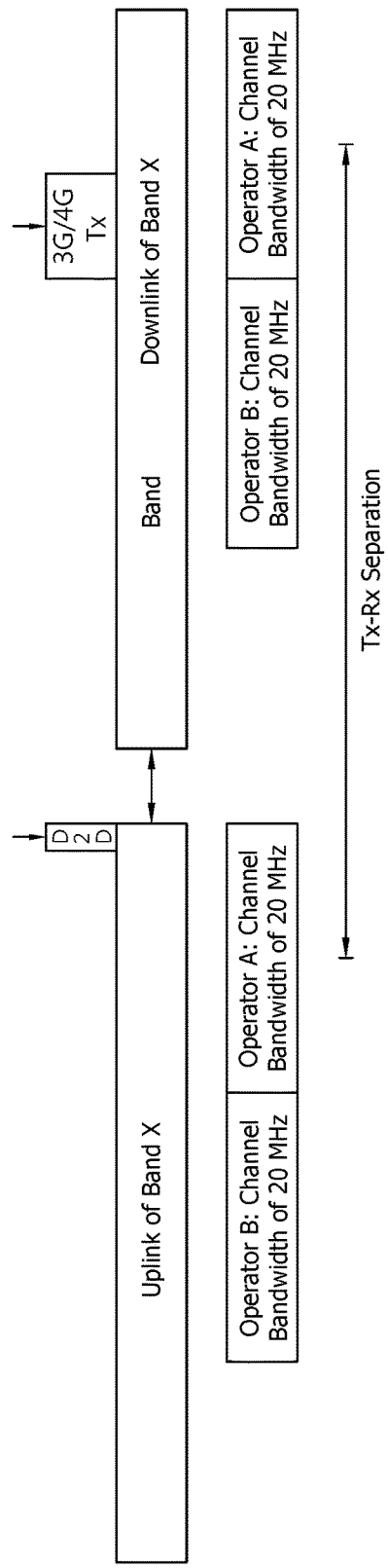
FIG. 13C shows Coexistence Scenario 3 in which D2D reception is performed using an uplink frequency and cellular reception is performed using a downlink frequency when the same operator manages frequencies separately for D2D communication and cellular communication.

FIG. 13C shows Coexistence Scenario 3 in which D2D reception is performed using an uplink frequency and cellular reception is performed using a downlink frequency when the same operator manages frequencies separately for D2D communication and cellular communication.

Referring to FIG. 13C, there is a huge isolation gap between a cellular reception band and a D2D reception band and it may maintain D2D reception sensitivity. Thus, Scenario 2 can be implemented with the RF structures shown in FIGS. 12B and 12C. The RF structure shown in FIG. 12B is somewhat complex and increases manufacturing costs since an additional D2D RF chain is required, but the RF structure shown in FIG. 12C is easy to be implemented with low manufacturing costs since simply a switch and a filter needs to be added. However, it is not possible to perform D2D reception and cellular reception simultaneously.

Figure 13D:
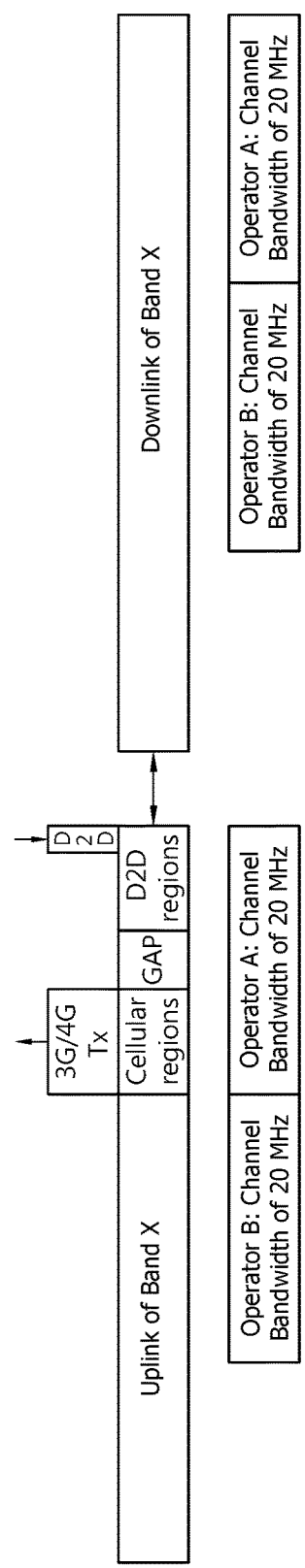
FIG. 13D shows Coexistence Scenario 4 in which D2D reception and cellular transmission are performed simultaneously when the same operator manages frequencies separately for D2D communication and cellular communication.

FIG. 13D shows Coexistence Scenario 4 in which D2D reception and cellular transmission are performed simultaneously when the same operator manages frequencies separately for D2D communication and cellular communication.

Referring to FIG. 13D, a band isolation between a transmission band and a reception band is less than 20 MHz, so a cellular transmission signal is possibly leaked into a D2D reception band and it may result in interference by the cellular transmission signal on the D2D reception signal. If a protection gap and A-MRP are added to protect D2D, this interference issue may be addressed. However, the size of the coverage may be reduced due to the presence of A-MPR.

All of the aforementioned scenarios can be summarized as below.

TABLE 4

| Scenario | Aggressor | Victim | Duplexing Type | Description |
|---|---|---|---|---|
| 1 | D2D Tx | LTE UE Rx | TDD and FDD | If a bandwidth gap between Tx and Rx is small, general operation may cause interference. |

TABLE 4-continued

| Scenario | Aggressor | Victim | Duplexing Type | Description |
|---|---|---|---|---|
| 2 | D2D Tx | LTE UE Tx | TDD and FDD | Simultaneously performing D2D Tx and LTE Tx is similar to intra-band non-continuous CA and thus it is possible. However, it is necessary to consider power unbalance. A D2D signal may be affected by high transmission power of cellular communication. Thus, a protection gap or A-MRP is needed to protect a D2D signal. |
| 3 | LTE UE Rx | D2D Rx | TDD and FDD | Transmission by an LTE base station does not seriously affect D2D Rx. It is necessary to add an SC-FDNA decoding chain to an uplink RF chain. |
| 4 | LTE UE Tx | D2D Rx | TDD and FDD | It is not possible to perform D2D Rx and LTE Tx simultaneously. Reference sensitivity (REFSENS) of D2D Rx is affected by LTE Tx. However, if an appropriate band gap exists between a D2D Rx band and a cellular Tx band, the problem may be alleviated. |

Figure 14A:
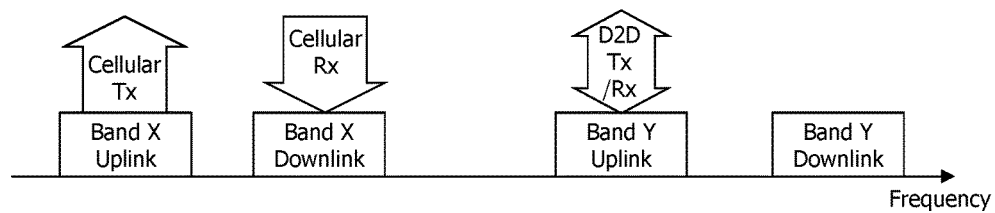
FIG. 14A shows an example in which a band for D2D communication and an LTE/LTE-A band for cellular communication are different.
Figure 14B:
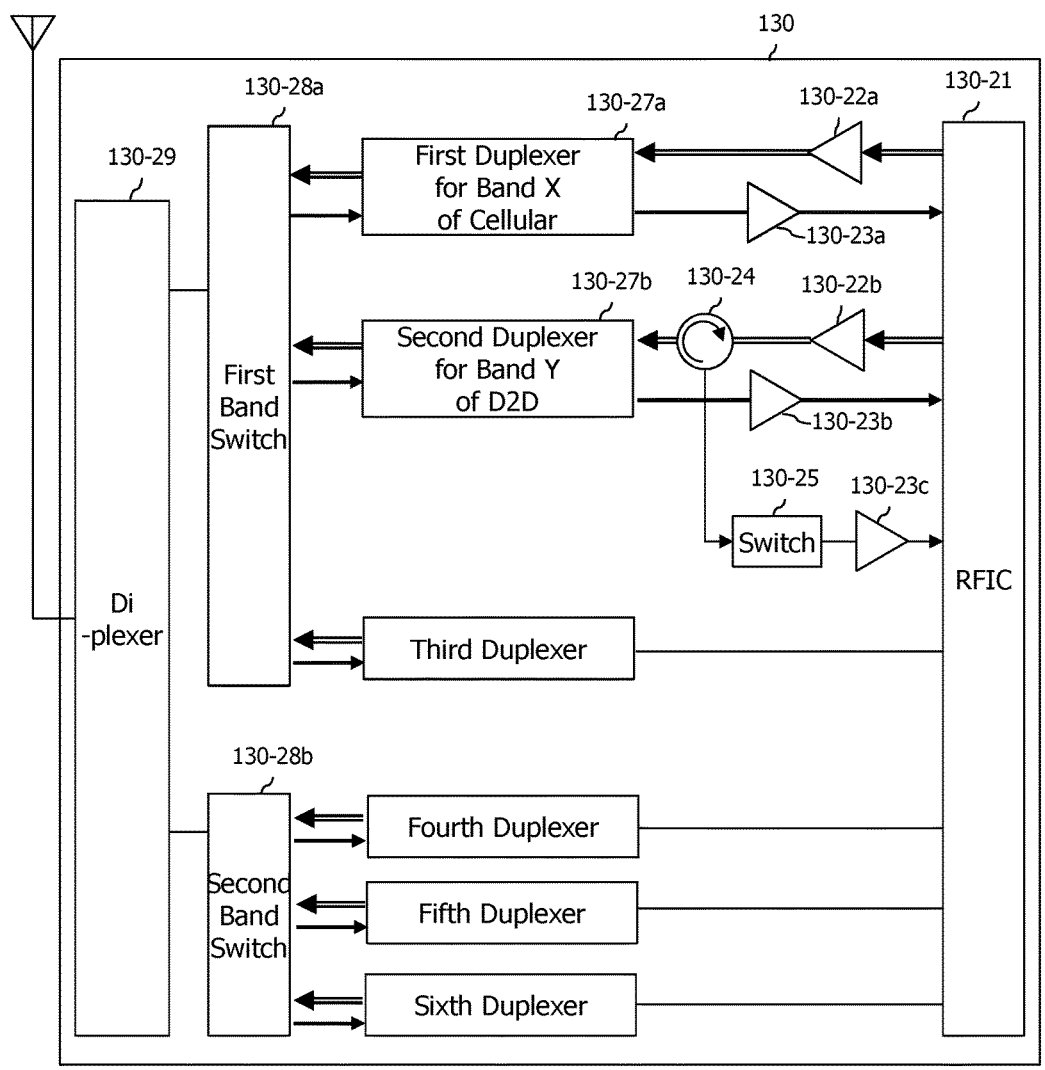
FIG. 14B shows an example of RF structure.

FIG. 14A shows an example in which a band for D2D communication and an LTE/LTE-A band for cellular communication are different, and FIG. 14B shows an example of RF structure.

In FIG. 14B, a structure is proposed which uses a radio frequency integrated circuit (RFIC) (including an amplifier, a composition unit, a filter, and a baseband unit) which accommodates a RF chains allocated for each band, similarly to the structure LTE-A release 10, in a case where a band for D2D communication and an LTE/LTE-A band for cellular communication are different, as illustrated in FIG. 14A.

Referring to FIG. 14B, there are an RFIC 130-21 accommodating a plurality of RF chains, a plurality of duplexer, a first band (e.g., high band) switch 130-28a for distinguishing a plurality of high band, a second band (e.g., low band) switch 130-28 for distinguishing a plurality of low band, and a diplexer 130-29.

A first duplexer 130-27a among the plurality of duplexer separates a transmission signal and a reception signal from Band X of cellular communication. Between the first duplexer 130-27a and the RFIC 130-21, a first PA 130-22a and a first LNA 130-23a are connected.

In a case where only Band X is used for cellular communication with inactivated Band Y and the Band Y is used for the D2D communication, a second duplexer 130-27b among the plurality of duplexer separates a D2D transmission signal and D2D reception signal from Band Y for the D2D communication. Between the second duplexer 130-27b and the RFIC 130-21, a second PA 130-22b, a second LNA 130-23b, a directional coupler 130-24, a switch 130-25, and a third LNA 130-23c are connected.

Meanwhile, a third duplexer among the plurality of duplexer separates a transmission and a reception signal from Band Z.

The diplexer 130-29 is configured to composite/separate low-band and high-band transmission/reception signals and the first band (e.g., high band) switch 130-28a is connected to the second band (e.g., low band) switch 130-28b.

The first band switch 130-28a exchanges signals selectively with any one of a first duplexer 130-27a for Band X of cellular communication, a second duplexer 130-27b for Band Y of D2D communication, and a third duplexer for Band X. Similarly, the second band switch 130-28b exchanges a signal selectively with any one of the second band switch 130-28b, a fourth duplexer, a fifth duplexer, and a sixth duplexer.

The first band duplexer 130-27a separates a cellular transmission signal and a cellular reception signal and transmits the same between the first band switch 130-28a and the RFIC 130-21. The first PA 130-22a is connected to a transmission line between the first band duplexer 130-27a and the RFIC 130-21, and the first LNA 130-23a is connected to a reception line between the first band duplexer 130-27a and the RFIC 130-21.

The second band duplexer 130-27b separates a D2D transmission signal and a D2D reception signal and transmits the same between the first band switch 130-28a and the RFIC 130-21. The first PA 130-22a and the directional coupler 130-24 are connected to a transmission line between the second band duplexer 130-27b and the RFIC 130-21, and the second LNA 130-23b is connected to a reception line between the second band duplexer 130-27b and the RFIC 130-21. The switch 130-25 and the third LNA 130-23c are connected to the directional coupler 130-24.

The RF structure shown in FIG. 14B can be described in the following in terms of transmission and reception.

First, the reception operation will be described.

Once a signal is received via an antenna, the diplexer 130-29 may transmit the signal to one of the first band switch 130-28a and the second band switch 130-28b. If the first band switch 130-28a receives the signal from the diplexer 130-29, the first band switch 130-28a transmits the signal to either or both of the first duplexer 130-27a and the second duplexer 130-27b. If the signal is a cellular reception signal, the first duplexer 130-27a transmits the signal to the RFIC 130-21 via the first LNA 130-23a. If the signal is a D2D reception signal of Band Y, the second duplexer 130-27b transmits the signal to the directional coupler 130-24 and then the directional coupler 130-24 transmits the D2D reception signal to the third LNA 130-23c so that the signal is transmitted to the RFIC 130-21 via the third LNA 130-23c. If a cellular signal of Band Y is received, the signal passes through the second duplexer 130-27b and then is transmitted to the RFIC 130-21 via the second LNA 130-23b.

Next, the transmission operation will be described.

A cellular transmission signal of Band X output from the RFIC 130-21 is amplified by passing through the first PA 130-22a, and then transmitted to the first duplexer 130-27a. The first duplexer 130-27a transmits the amplified cellular transmission signal to the first band switch 130-28a. In addition, a D2D transmission signal of Band Y output from the RFIC 130-21 is amplified by passing through the second PA 130-22b, and then transmitted to the directional coupler 130-24, and the directional coupler 130-24 transmits the amplified D2D transmission signal to the second duplexer 130-27b. The second duplexer 130-27b transmits the amplified D2D transmission signal to the first band switch 130-28a. The first band switch 130-28a selectively transmits the amplified cellular transmission signal and the amplified D2D transmission signal, or transmits the both to the diplexer 130-29 via a diplexer that is added between the first band switch and duplexers.

Figure 14C:
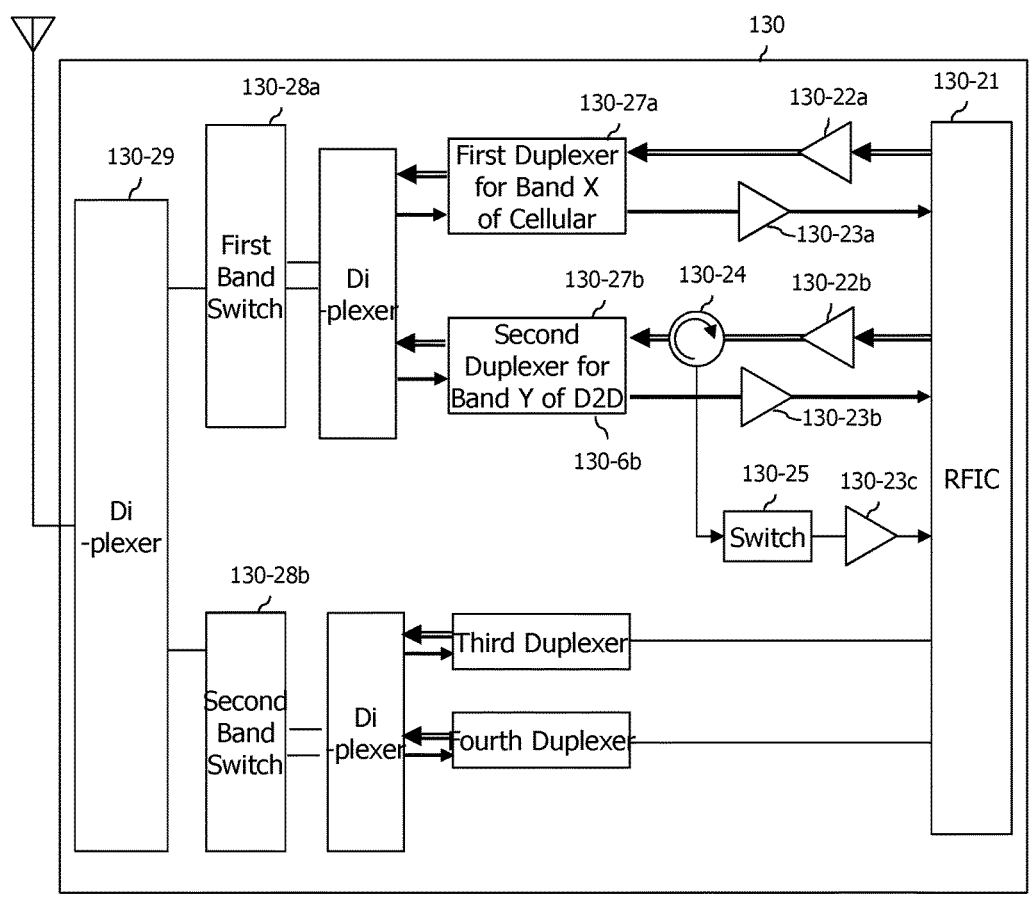
FIG. 14C shows an example of variation of the RF structure shown in FIG. 14B.

FIG. 14C shows an example of variation of the RF structure shown in FIG. 14B.

As found with reference to FIG. 14C, a diplexer is added between the first band switch 130-28a and duplexers. In addition, a diplexer is added even between the second band switch 130-28b and duplexers.

According to FIG. 14C, it is possible to perform D2D transmission and cellular transmission simultaneously.

Figure 14D:
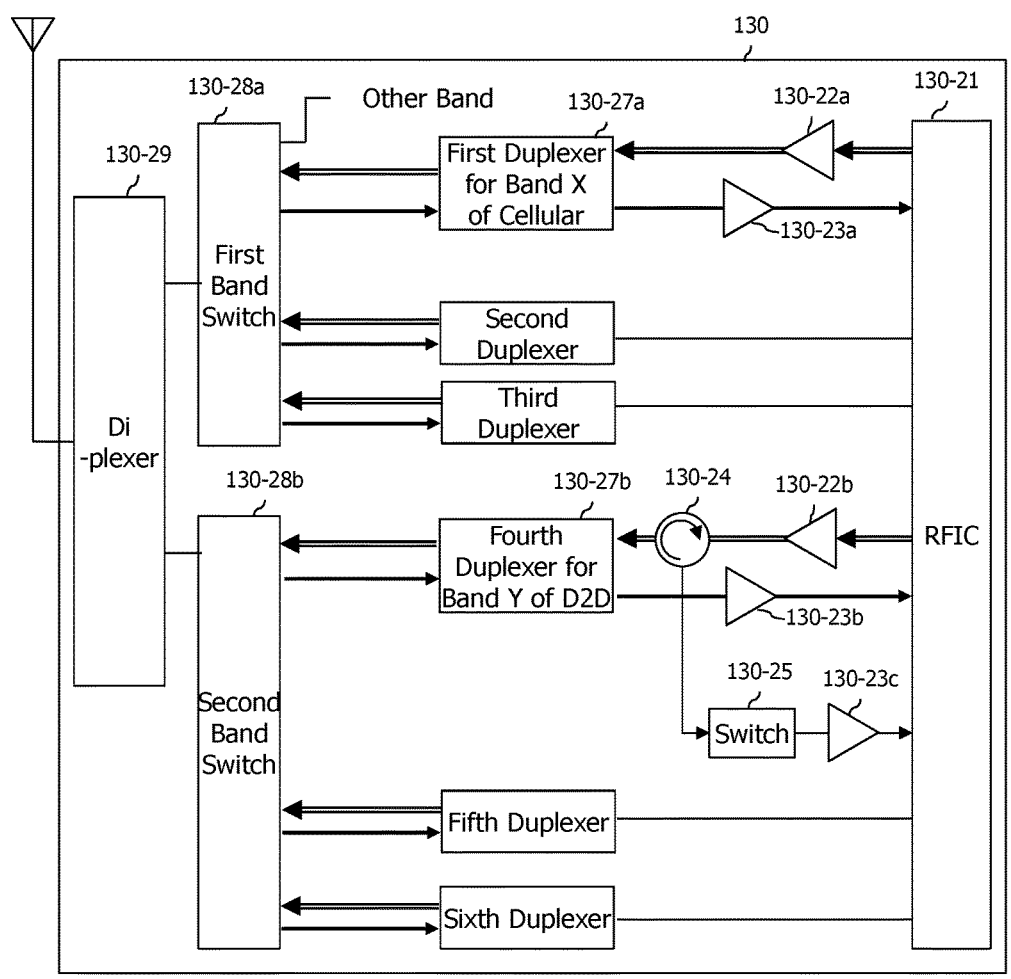
FIG. 14D shows another example of variation of the RF structure shown in FIG. 14B.

FIG. 14D shows another example of variation of the RF structure shown in FIG. 14B.

As found with reference to FIG. 14D, a fourth duplexer connected to the second band switch 130-28b separates a transmission signal and a reception signal in Band Y for D2D communication.

According to the structure shown in FIG. 14C, it is possible to perform D2D transmission and cellular transmission simultaneously The above explanation can be summarized as below.

Option 1: Whether to perform D2D transmission and cellular reception depends on an operating band.

Option 2: It is possible to simultaneously perform D2D transmission and cellular transmission, but in-band emission needs to be considered further.

Option 3: If an additional RF chain is added for reception of D2D communication, it is possible to perform D2D reception and cellular reception.

Option 4: It is not possible to perform D2D reception and cellular transmission simultaneously because a gap between a band for D2D reception and a band for cellular transmission is small.

The aforementioned embodiments of the present invention may be implemented using various means. For example, the embodiments of the present invention may be implemented as hardware, firmware, software, or a combination thereof. Detailed description thereof will be provided with reference with a drawing.

Figure 15:
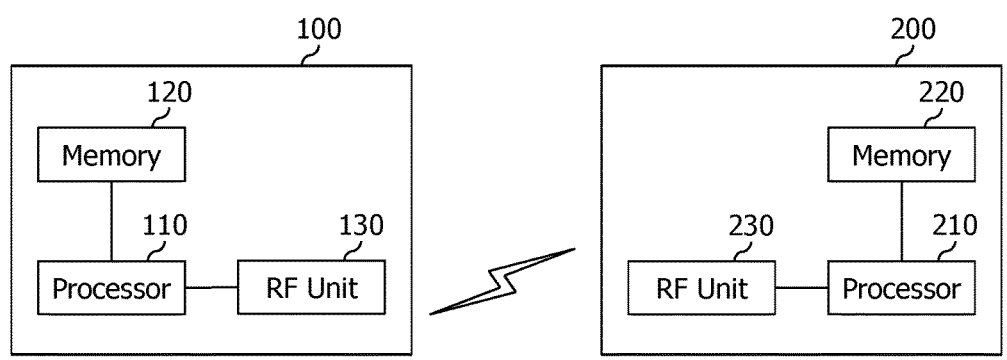
FIG. 15 is a block diagram illustrating a wireless communication system that implements the disclosure of the present invention.

FIG. 15 is a block diagram illustrating a wireless communication system that implements the disclosure of the present invention.

A base station 200 includes a processor 210, a memory 220, and an RF unit 230. The memory 220 is connected to the processor 210 to store various types of information required to drive the processor 210. The RF unit 230 is connected to the processor 210 to transmit and/or receive a radio signal. The processor 210 implements the proposed functions, procedures, and/or methods. Operation of a base station in the aforementioned embodiments may be implemented by the processor 210.

An UE includes a processor 110, a memory 120, and an RF unit 130. The memory 120 is connected to the processor 110 to store various types of information required to drive the processor 110. The RF unit 130 is connected to the processor 110 to transmit and/or receive a radio signal. The processor 110 implements the proposed functions, procedures, and/or methods.

A processor may include Application-Specific Integrated Circuits (ASICs), other chipsets, logic circuits, and/or data processors. A memory may include Read-Only Memory (ROM), Random Access Memory (RAM), flash memory, memory cards, storage media and/or other storage devices. An RF unit may include a baseband circuit for processing a radio signal. When the above-described embodiments are implemented as software, the above-described scheme may be implemented using a module (process or function) which performs the above function. The module may be stored in the memory and executed by the processor. The memory may be disposed to the processor internally or externally and connected to the processor using a variety of known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A User Equipment (UE) comprising:
a first duplexer configured to separate a first transmission signal and a first reception signal in a first band for cellular communication;
a second duplexer configured to separate a second transmission signal for Device to Device (D2D) communication and a second reception signal for one of the cellular communication or the D2D communication in a second band,
wherein the second duplexer is used for both of the cellular communication and the D2D communication,
wherein, when the second reception signal is for the cellular communication, the second duplexer transfers the second reception signal to a low noise Amplifier (LNA), and
wherein, when the second reception signal is for the D2D communication, the second duplexer transfers the second reception signal to a directional coupler determining transmission direction of the second transmission signal and the second reception signal; and
a first band switch configured to select one of the first duplexer or the second duplexer,
wherein the first band and the second band correspond to different inter-bands.

2. The UE of claim 1, further comprising:
a radio frequency integrated circuit (RFIC) configured to generate and output the first transmission signal of the first band and the second transmission signal of the second band, and process the first reception signal of the first band and the second reception signal of the second band,
wherein the RFIC selectively transmits data by outputting the first transmission signal of the first band and the second transmission signal of the second band to the first and second duplexers,
wherein a cellular signal received through the second band is received via an existing cellular RF chain, and, when the cellular communication is disabled, a signal received for the D2D communication passes through a switch and an low noise amplifier (LNA) for the D2D communication and is then received in the RFIC.

3. The UE of claim 2, further comprising:
a diplexer connected between the first band switch and the first duplexer and between the first band switch and the second duplexer,
wherein the diplexer transmits both of the first transmission signal of the first band from the first duplexer and the second transmission signal of the second band from the second duplexer to the first band switch.

4. The UE of claim 1, further comprising:
a second band switch; and
a diplexer connected to the first band switch and the second band switch.

5. The UE of claim 1, wherein the second transmission signal and the second reception signal for the D2D communication comprise a discovery signal, a control channel, and a data channel.

6. The UE of claim 1, wherein the second transmission signal and the second reception signal for the D2D communication comprise at least one of a Physical Sidelink Shared Channel (PSSCH), a Physical Sidelink Control Channel (PSCCH), a Physical Sidelink Discovery Channel (PSDCH), or a Physical Sidelink Broadcast Channel (PSBCH).

* * * * *